United States Patent
Barlev

(10) Patent No.: US 10,178,502 B2
(45) Date of Patent: Jan. 8, 2019

(54) SYSTEM AND METHOD FOR SIMULTANEOUS LOCATION TRACKING OF MULTIPLE WIRELESS TERMINALS

(71) Applicant: VERINT SYSTEMS LTD., Herzliya Pituach (IL)

(72) Inventor: Ishay Barlev, Limassol (CY)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

(21) Appl. No.: 15/084,406

(22) Filed: Mar. 29, 2016

(65) Prior Publication Data

US 2016/0286353 A1    Sep. 29, 2016

(30) Foreign Application Priority Data

Mar. 29, 2015   (IL) .......................................... 238002

(51) Int. Cl.
*H04W 4/02* (2018.01)
*H04W 56/00* (2009.01)
(Continued)

(52) U.S. Cl.
CPC .............. *H04W 4/023* (2013.01); *G01S 5/02* (2013.01); *G01S 5/0221* (2013.01);
(Continued)

(58) Field of Classification Search
CPC ....... H04W 4/14; H04W 4/023; H04W 4/029; H04W 56/0015; H04W 64/00; G01S 5/02; G01S 5/0221
See application file for complete search history.

(56) References Cited

U.S. PATENT DOCUMENTS

| 6,839,023 | B1 * | 1/2005 | Benco ..................... | H04M 3/42 |
| | | | | 342/357.4 |
| 8,331,954 | B2 * | 12/2012 | Beck ..................... | H04W 24/08 |
| | | | | 455/11.1 |

(Continued)

FOREIGN PATENT DOCUMENTS

WO        2010/116292       10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — Wayne H Cai
(74) *Attorney, Agent, or Firm* — Meunier Carlin & Curfman

(57) ABSTRACT

A location-tracking system that includes multiple detector units that are deployed in a region of interest. The detector units receive uplink signals from wireless terminals that are active in the region, and measure the strengths of the received uplink signals. The system computes the locations of the terminals based on the measured signal strengths and the known locations of the detector units. The location-tracking system receives and analyzes downlink signals from one or more of the base stations of the wireless network. The detector unit uses the downlink signal to recover and synchronize to the timing of the wireless network's air-interface. Based on the extracted uplink allocations, and having synchronized with the air-interface, the system is able to distinguish between the uplink signal components originating from each terminal, and thus compute the location of each terminal.

20 Claims, 2 Drawing Sheets

(51) Int. Cl.
*H04W 4/029* (2018.01)
*H04W 64/00* (2009.01)
*G01S 5/02* (2010.01)
*H04W 4/14* (2009.01)

(52) U.S. Cl.
CPC ............ *H04W 4/029* (2018.02); *H04W 4/14* (2013.01); *H04W 56/0015* (2013.01); *H04W 64/00* (2013.01)

(56) References Cited

U.S. PATENT DOCUMENTS

| | | | | |
|---|---|---|---|---|
| 8,619,706 | B2* | 12/2013 | Kalhan | H04W 88/10 370/331 |
| 2001/0039192 | A1* | 11/2001 | Osterling | H04B 7/2693 455/502 |
| 2012/0163222 | A1* | 6/2012 | Islam | G01S 5/0205 370/252 |
| 2013/0030931 | A1* | 1/2013 | Moshfeghi | G01S 19/48 705/16 |
| 2014/0274136 | A1* | 9/2014 | Edge | H04W 4/04 455/456.2 |
| 2016/0018508 | A1* | 1/2016 | Chen | G01S 5/0252 455/456.1 |

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.
"Cell Scanning and Catcher Detection in unnoticeable pocket size," NetHawk C2, Data sheet, version 1.4, EXFO, 2010, 4 pages.
Girardin, F., et al., "Detecting air travel to survey passengers on a worldwide scale," Journal of Location Based Services, 2010, 26 pages.
Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.
Strobel, D., "IMSI Catcher," Seminararbeit, Ruhr-Universität Bochum, 2007, pp. 13-24.
Vedaldi, A., "An implementation of SIFT detector and descriptor," University of California at Los Angeles, 2007, 7 pages.
Riegel, Max et al., "Deploying Mobile WiMAX," 2009, John Wiley and Sons Ltd., 4 pages.
Delicado, Jesus et al, "Study of the IEEE 802.16 contention-based request mechanism," 2008 Springer Science and Business Media, LLC, 9 pages.
Ahson, Syed et al, "WiMAX Standards and Security," 2008, CRC Press, Taylor & Francis Group, 5 pages.
Greenlaw, Raymond et al., Secure Roaming in 802.11 Networks, 2007, Elsevier Inc., 4 pages.

* cited by examiner

SYSTEM AND METHOD FOR SIMULTANEOUS LOCATION TRACKING OF MULTIPLE WIRELESS TERMINALS

FIELD OF THE DISCLOSURE

The present disclosure relates generally to wireless network monitoring, and particularly to methods and systems for tracking locations of wireless terminals.

SUMMARY OF THE DISCLOSURE

An embodiment that is described herein provides a method including receiving, using multiple detector units, uplink signals from multiple wireless communication terminals that communicate simultaneously with one or more base stations of a wireless network. Time-frequency uplink allocations assigned to the respective wireless terminals are extracted from a downlink signal of at least one of the base stations. Respective locations of the wireless terminals are computed based on the uplink signals received by the detector units and on the extracted uplink allocations.

In some embodiments, extracting the uplink allocations includes receiving the downlink signal in at least one of the detector units. In an embodiment, extracting the uplink allocations includes receiving the downlink signal in a given detector unit, synchronizing the uplink signals received in the given detector unit with the downlink signal received in the given detector unit, and synchronizing the multiple detector units with one another. In another embodiment, extracting the uplink allocations includes receiving the downlink signal in each detector unit, and synchronizing the uplink signals received in each detector unit with the downlink signal received in that detector unit.

In some embodiments, computing the locations includes distinguishing, using the uplink allocations, between at least first and second components of the received uplink signals that originate from respective first and second wireless terminals, and computing first and second locations of the first and second wireless terminals using the first and second components, respectively. In an embodiment, the first and second components overlap in time. Additionally or alternatively, the first and second components overlap in frequency.

In another embodiment, computing the locations includes measuring respective signal strengths with which a component of the uplink signal, originating from a given wireless terminal, is received at the detector units, and computing a location of the given wireless terminal based on the signal strengths. In yet another embodiment, the method includes soliciting one or more of the wireless communication terminals to transmit the uplink signals, by transmitting one or more silent messages to the wireless communication terminals.

There is additionally provided, in accordance with an embodiment that is described herein, a system including multiple detector units and one or more processors. The multiple detector units are configured to receive uplink signals from multiple wireless communication terminals that communicate simultaneously with one or more base stations of a wireless network. The one or more processors are configured to extract from a downlink signal of at least one of the base stations time-frequency uplink allocations assigned to the respective wireless terminals, and to compute respective locations of the wireless terminals based on the uplink signals received by the detector units and on the extracted uplink allocations.

The present disclosure will be more fully understood from the following detailed description of the embodiments thereof, taken together with the drawings in which:

DETAILED DESCRIPTION OF EMBODIMENTS

Overview

Figure 1:
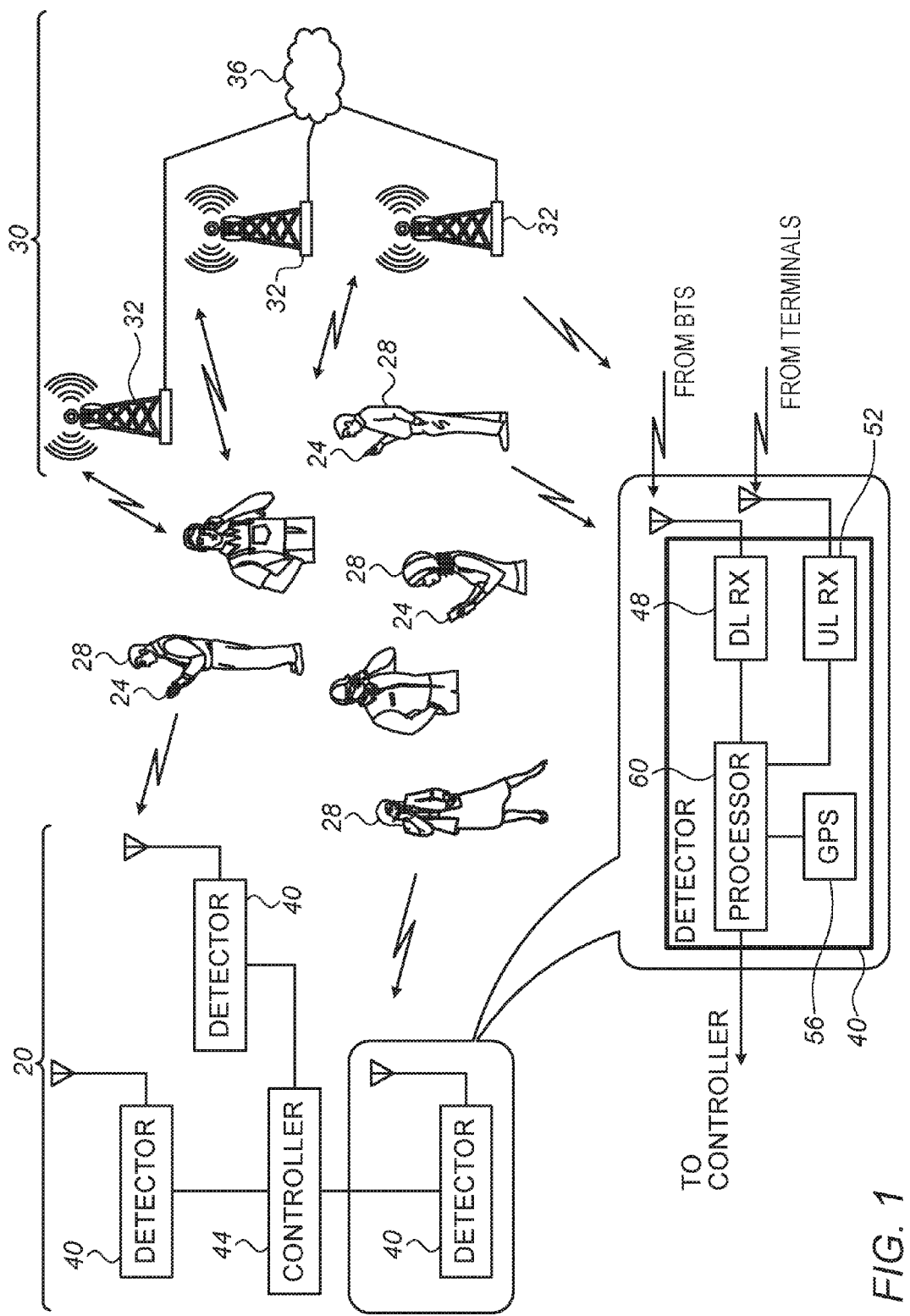
FIG. 1 is a block diagram that schematically illustrates a system for simultaneous location-tracking of wireless communication terminals, in accordance with an embodiment that is described herein.

Embodiments that are described herein provide improved methods and systems for estimating the locations of wireless communication terminals that communicate with a wireless network. In the disclosed embodiments, a location-tracking system comprises multiple detector units that are deployed in a region of interest. The detector units receive uplink signals from wireless terminals that are active in the region, and measure the strengths of the received uplink signals. The system computes the locations of the terminals based on the measured signal strengths and the known locations of the detector units.

When multiple terminals are active simultaneously, however, simple signal-strength measurements are practically useless for location estimation. Depending on the air-interface used by the wireless network, each terminal is typically allocated certain time-frequency bins on the uplink, and uses these allocations for transmitting. Without knowledge of the actual uplink allocations, it is all but impossible to distinguish between the individual uplink transmissions of different terminals in order to track their locations.

In some embodiments, the location-tracking system overcomes the above problem by receiving and analyzing downlink signals from one or more of the base stations of the wireless network. In an example embodiment, one of the detector units comprises a downlink receiver that receives a downlink signal from a base station. The detector unit decodes the downlink signal and extracts time-frequency uplink allocations that are signaled to the terminals. In addition, the detector unit uses the downlink signal to recover and synchronize to the timing of the wireless network's air-interface. (The detector units are typically synchronized to one another, e.g., using GPS). Based on the extracted uplink allocations, and having synchronized with the air-interface, the system is able to distinguish between the uplink signal components originating from each terminal, and thus compute the location of each terminal.

In an alternative embodiment, each of the detector units is capable of receiving both uplink and downlink signals. The detector units spend most of their time measuring the uplink, but also switch at known intervals to measure the downlink and keep synchronized to it. In this manner, synchronization between the detector units is not required.

In some embodiments, the system solicits multiple terminals to transmit and be intercepted by the detector units. For example, the system may comprise a downlink transmitter that transmits silent calls or silent SMS messages to multiple terminals simultaneously. The terminals respond to the silent calls or SMS messages by transmitting on the uplink, and the uplink transmissions are subsequently detected and located by the detector units using the disclosed techniques. This feature is useful, for example, when the terminals are not sufficiently active.

The methods and systems described herein provide an efficient and unobtrusive means for tracking the locations of wireless terminals and their users. The disclosed techniques are particularly useful when multiple terminals are active simultaneously, especially when the air-interface is complex and uses allocations that overlap in time and frequency.

System Description

FIG. 1 is a block diagram that schematically illustrates a system 20 for location-tracking of wireless communication terminals 24 that communicate with a wireless network 30, in accordance with an embodiment that is described herein. System 20 may be used, for example, by law enforcement agencies for tracking the locations of users 28 that operate terminals 24.

Terminals 24 may comprise, for example, cellular phones, smartphones, wireless-enabled mobile computing devices, or any other suitable type of terminals. Wireless network 30 comprises base stations 32 and a core network 36. Terminals 24 communicate with network 30 by transmitting uplink signals to base stations 32 and receiving downlink signals from the base stations. Network may operate in accordance with any suitable communication protocol, such as Global System for Mobile communications (GSM), Universal Mobile Telecommunications System (UMTS) and Long-Term Evolution (LTE).

In some embodiments, location-tracking system 20 comprises multiple detector units 40 (referred to as detectors for brevity) and a controller 44. Detectors 40 are typically placed at different locations in a region of interest. Detectors 40 and controller 44 communicate with one another using any suitable communication means. The figure shows three detectors by way of example, but system 20 may generally comprise any suitable number of detectors 40.

In the present example, each detector 40 comprises an uplink receiver (UL RX) 52, a Global Positioning System (GPS) receiver 56, and a processor 60. UL RX 52 is configured to receive uplink signals from terminals 24. GPS receiver 56 measures the location of the detector and provides an accurate time-base for time-synchronizing detectors 40 with one another. Processor 60 communicates with controller 44 and possibly carries out some of the location measurement tasks jointly with the controller.

In the disclosed embodiments, at least one of detectors 40 comprises a downlink receiver (DL RX) 48 for receiving a downlink signal from at least one of base stations 32. The received downlink signal is used by system 20 to recover the timing of the air-interface of network 30, and to extract the time-frequency uplink allocations assigned to the various terminals 24. These functions, and their use in location tracking, are explained in detail below.

In alternative embodiments, each detector 40 comprises a respective DL RX 48 and a respective UL RX 52, so that each detector 40 is capable of receiving both uplink and downlink signals. In an embodiment, processor 60 in each detector controls DL RX 48 and UL RX 52, and in particular switches between the two receivers. Typically, each detector 40 spends most of the time receiving uplink signals from terminals 24 using UL RX 52. At certain known time intervals, processor 60 switches to DL RX 48, and receives and synchronizes to the downlink timing. When using this technique, each detector 40 recovers and synchronizes separately to the timing of the air-interface of network 30. As such, there is no need to synchronize detectors 40 with one another.

The system configurations shown in FIG. 1 and described above are example configurations that are chosen purely for the sake of conceptual clarity. In alternative embodiments, any other suitable system configurations can be used. For example, any of detectors 40, not necessarily one detector or all detectors, may comprise DL RX 48. As another example, synchronization among the detectors, and measurement of the detector locations, may be performed using any suitable means, not necessarily using GPS receivers. As yet another example, the functions of controller 44 may be performed by one of processors 60, or jointly by two or more of the processors.

Certain elements of system 20 can be implemented using hardware, such as using one or more Application-Specific Integrated Circuits (ASICs), Field-Programmable Gate Arrays (FPGAs) or other device types. Additionally or alternatively, certain elements of system 20 can be implemented using software, or using a combination of hardware and software elements. In some embodiments, controller 44 and/or processors 60 in the detector units comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Location-Tracking of Multiple Active Terminals

Terminals 24 communicate with wireless network 30 by transmitting uplink signals to base stations 32 and receiving downlink signals to the base stations. Typically, network 30 allocates uplink time-frequency resources to each terminal 24, and each terminal uses its allocated resources for transmitting uplink signals. Each base station 32 typically notifies its served terminals 24 of their uplink allocations by sending control messages over the downlink. The allocations are typically adaptive and change over time in accordance with the traffic needs of the various terminals.

The specific types of uplink allocations, and the signaling scheme used for reporting the allocations on the downlink, depends on the communication protocol used by wireless network 30. In GSM, for example, the allocations comprise time slots that are assigned in uplink time frames. As another example, in LTE the allocations comprise time-frequency resource elements (REs) assigned in uplink sub-frames. Generally, the uplink resources assigned to different terminals may overlap in time and/or in frequency.

As can be seen from the description above, when multiple terminals 24 are active, the uplink signals received at detectors 40 comprise a superposition of signals from various terminals 24. As such, simple signal-strength measurements of the uplink signals, without considering the actual uplink allocations of each terminal, are useless for location measurements.

In some embodiments, system 20 extracts the information regarding the actual uplink allocations from downlink signals of one or more of base stations 32. Typically, at least one of detectors 40 receives a downlink signal using its DL RX 48. Processor 60 of this detector decodes control-channel messages conveyed by the downlink signal, and extracts the uplink allocations from the control-channel messages.

Based on the uplink allocations, processors 60 are able to distinguish between the uplink signal components originating from different individual terminals, even though multiple terminals are active simultaneously.

In an example embodiment, processor 60 of each detector 40 calculates the signal strength of the received uplink signal per time and/or frequency bin, and forwards this information to controller 44. Controller 44 receives the uplink signal strength reports (per time and/or frequency bin) from the different detectors, and also receives the extracted uplink allocations.

Based on this information, controller 44 is able to determine the signal strength with which the uplink signal of a particular terminal was received at the different detectors 40. The controller then translates these signal strength measurements into location coordinates of that terminal. This process may be performed for every terminal whose uplink allocation is available, or only for one or more selected terminals of interest.

In order to distinguish correctly between uplink signal components originating from different terminals 24, detectors 40 should be synchronized with the timing of the air-interface of wireless network 30. In some embodiments, this synchronization is achieved by synchronizing the timing of detectors 40 to the downlink signal received in DL RX 48 of one or more of the detectors. In some embodiments, one of detectors 40 synchronizes to the air-interface of network 30, and the detectors also synchronize with one another, for example using GPS receivers 56. Controller 44 may also comprise a GPS receiver for synchronizing to this common time base. In other embodiments, each detector 40 synchronizes separately to the air-interface of wireless network 30.

As noted above, the set of uplink signal-strength values, as received from a given terminal by the multiple detectors, is indicative of the location of the terminal. Controller 44 may translate the set of signal-strength values into a location coordinate of the terminal in various ways. For example, controller 44 may hold a predefined database that maps sets of signal-strength values into respective coordinates. Such a database may be obtained, for example, by propagation modeling or by performing drive-tests over the region of interest.

Figure 2:
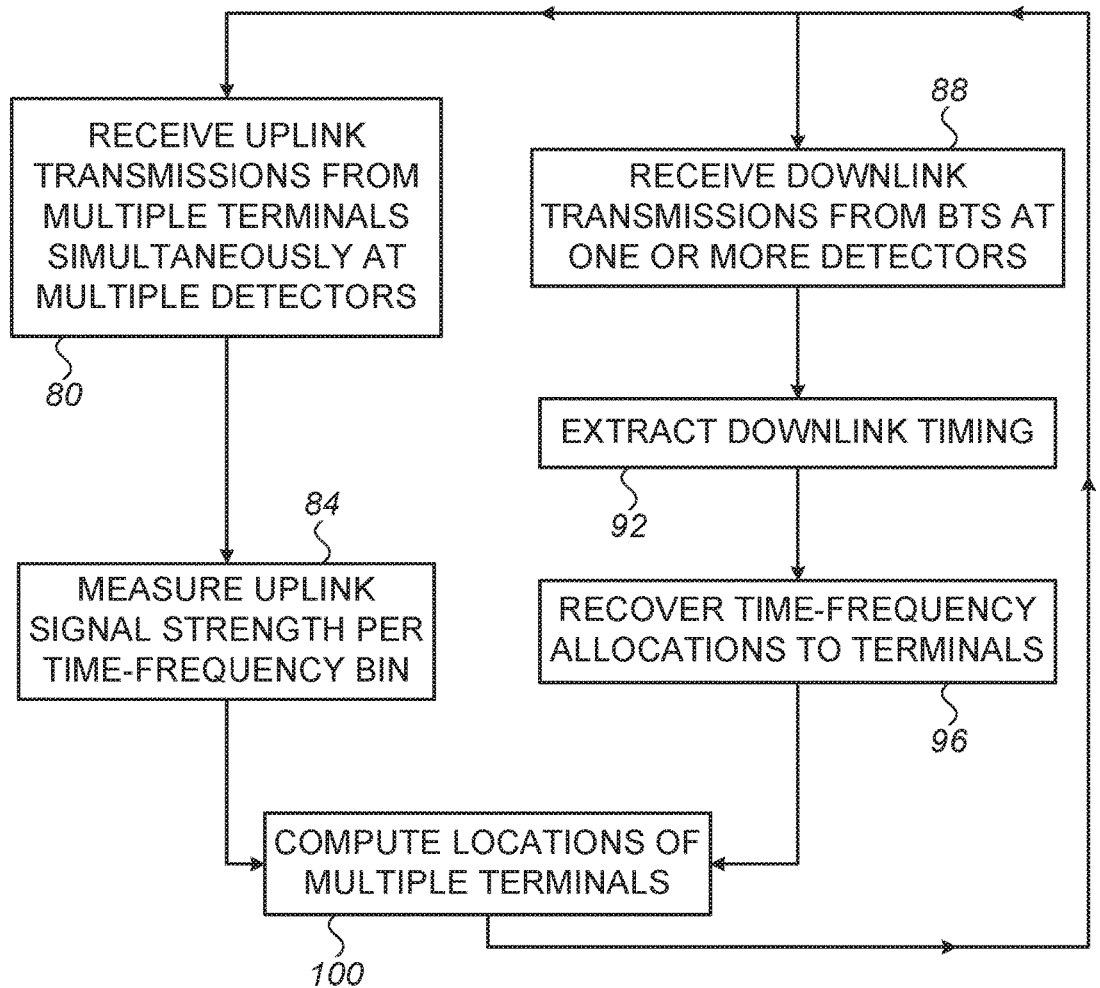
FIG. 2 is a flow chart that schematically illustrates a method for simultaneous location-tracking of wireless communication terminals, in accordance with an embodiment that is described herein.

FIG. 2 is a flow chart that schematically illustrates a method for simultaneous location-tracking of wireless communication terminals, in accordance with an embodiment that is described herein. The method refers to the system configuration of FIG. 1, but can be implemented in a similar manner using any other suitable configuration.

The method begins with detectors 40 receiving uplink signals originating from multiple terminals 24, at an uplink reception step 80. Each detector 40 measures the received signal strength per time-frequency bin, at a signal-strength measurement step 84. The measured signal-strength values are sent from detectors 40 to controller 44.

Typically at the same time, one of detectors 40 receives a downlink signal from one of base stations 32, at a downlink reception step 88. The detector recovers the timing of the air-interface of wireless network 30 from the received downlink signal, at a timing recovery step 92. The recovered timing enables system 20 to synchronize its own timing with the air-interface of network 30. At an allocation extraction step 96, the detector extracts the time and/or frequency uplink allocations signaled over the downlink signal.

At a location computation step 100, controller 44 computes the location coordinates of the various terminals 24 based on the extracted allocations (output of step 96) and the measured signal strengths per time-frequency bin (output of step 84). The method then loops back to steps 80 and 88 above, to continue receiving the uplink and downlink signals and update the location computations.

Controller 44 may use the location coordinates of terminals 24 in any suitable way. For example, the controller may output the location coordinates to an operator or to some other system, store the coordinates for later use, or take any other suitable action.

The embodiments described herein refer to a particular partitioning of functions between detectors 40 and controller 44, and in particular between processors 60 of the detectors and controller 44. This partitioning, however, is depicted purely for the sake of conceptual clarity. In alternative embodiments, any other division of functions among the various elements of system 20 can be used. In the present context, controller 44 and processors 60 are referred to collectively as one or more processors that carry out the disclosed techniques.

In some embodiments, system 20 further comprises a transmitter that solicits multiple terminals 24 to transmit, in order to cause the transmissions to be intercepted by detector units 40. For example, the transmitter may transmit silent calls or silent SMS messages (also referred to as "stealth SMS" or "stealth ping") to multiple terminals simultaneously. Such messages are typically unnoticeable by users 28. Terminals 24 respond to the silent calls or SMS messages by transmitting on the uplink, and the uplink transmissions are subsequently detected and located by detector units 40 using the techniques described above.

Although the embodiments described herein mainly address cellular networks, the principles of the present disclosure can also be used for locating other types of communication terminals such as Wireless Local-Area Network (WLAN) devices.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method performed by a location tracking system comprising multiple detector units and a controller, each of the multiple detector units include at least an uplink receiver, a downlink receiver, and a processor, the method comprising:

each detector unit of the multiple detector units:
intercepting, by the uplink receiver, uplink signals from multiple wireless communication terminals that communicate simultaneously with one or more base stations of a wireless network;
intercepting, by the downlink receiver, a downlink signal that has been sent from at least one of the base stations of the wireless network to the multiple wireless communication terminals;
decoding, by the processor, control-channel messages conveyed by the intercepted downlink signal; and extracting, by the processor, from the intercepted downlink signal, time-frequency uplink allocations assigned to the respective wireless communication terminals; and computing respective location coordinates of the wireless communication terminals based on the uplink signals intercepted by the detector units and on the time-frequency uplink allocations extracted by the detector units from the downlink signal sent from the at least one base station to the multiple wireless communication terminals and intercepted by the multiple detector units.

2. The method according to claim 1, wherein the computing of the respective location coordinates is performed by a processor of at least one of the detector units or by the controller, wherein the controller is external to the detector units.

3. The method according to claim 1, wherein a given detector unit further comprises a Global Positioning System (GPS) receiver, and wherein extracting the uplink allocations comprises:

measuring, by the GPS receiver, the location of the given detector;

providing, by the GPS receiver, a time-base for time-synchronizing the multiple detectors with one another;

synchronizing the uplink signals intercepted by the given detector unit with the downlink signal intercepted by the given detector unit; and synchronizing the multiple detector units with one another based on the time-base provided by the GPS receiver.

4. The method according to claim 1, wherein extracting the uplink allocations comprises synchronizing the uplink signals intercepted by each detector unit with the downlink signal intercepted by that detector unit.

5. The method according to claim 1, wherein computing the location coordinates comprises distinguishing, using the uplink allocations, between at least first and second components of the intercepted uplink signals that originate from respective first and second wireless terminals, and computing first and second location coordinates of the first and second wireless terminals using the first and second components, respectively.

6. The method according to claim 5, wherein the first and second components overlap in time.

7. The method according to claim 5, wherein the first and second components overlap in frequency.

8. The method according to claim 1, wherein computing the location coordinates comprises measuring respective signal strengths with which a component of the uplink signal, originating from a given wireless terminal, is intercepted by the detector units, and computing a location coordinate of the given wireless terminal based on the signal strengths.

9. The method according to claim 1, further comprising soliciting one or more of the wireless communication terminals to transmit the uplink signals, by transmitting one or more silent messages to the wireless communication terminals.

10. The method according to claim 1, wherein the location tracking system is distinct from the wireless network.

11. A location tracking system, comprising:

multiple detector units, wherein each of the multiple detector units comprises:

an uplink receiver, which is configured to intercept uplink signals from multiple wireless communication terminals that communicate simultaneously with one or more base stations of a wireless network, a downlink receiver, which is configured to intercept a downlink signal that has been sent from at least one of the base stations of the wireless network to the multiple wireless communication terminals; and a processor, which is configured to decode control-channel messages conveyed by the received downlink signal and to extract from the received downlink signal time-frequency uplink allocations assigned to the respective wireless terminals; and a controller, wherein respective location coordinates of the wireless communication terminals are computed based on the uplink signals intercepted by the detector units and on the time-frequency uplink allocations extracted by the detector units from the downlink signal sent from the at least one base station to the multiple wireless communication terminals and intercepted by the multiple detector units.

12. The system according to claim 11, wherein computing the respective location coordinates is performed by a processor of at least one of the detector units or by the controller, wherein the controller is external to the detector units.

13. The system according to claim 11, wherein a given detector unit further comprises a Global Positioning System (GPS) receiver that is configured to measure the location of the given detector and to provide a time-base for time-synchronizing the multiple detectors with one another, and wherein the processor is configured to synchronize the uplink signals intercepted by the given detector unit with the downlink signal intercepted by the given detector unit, and to synchronize the multiple detector units with one another based on the time-base provided by the GPS receiver.

14. The system according to claim 11, wherein the processor is configured to synchronize the uplink signals intercepted by each detector unit with the downlink signal intercepted by that detector unit.

15. The system according to claim 11, wherein the processors are configured to distinguish, using the uplink allocations, between at least first and second components of the intercepted uplink signals that originate from respective first and second wireless terminals, and to compute first and second location coordinates of the first and second wireless terminals using the first and second components, respectively.

16. The system according to claim 15, wherein the first and second components overlap in time.

17. The system according to claim 15, wherein the first and second components overlap in frequency.

18. The system according to claim 11, wherein the processors of the detector units are configured to measure respective signal strengths with which a component of the uplink signal, originating from a given wireless terminal, is intercepted by the detector units, and wherein the processors are configured to compute a location coordinate of the given wireless terminal based on the signal strengths.

19. The system according to claim 11, further comprising a transmitter that is configured to solicit one or more of the wireless communication terminals to transmit the uplink signals, by transmitting one or more silent messages to the wireless communication terminals.

20. The system according to claim 11, wherein the location tracking system is distinct from the wireless network.

* * * * *